United States Patent [19]

Nomura

[11] Patent Number: 5,555,386
[45] Date of Patent: Sep. 10, 1996

[54] DATA FLOW PROCESSOR WITH VARIABLE LOGIC CONNECTION BETWEEN PROCESSORS IN A SYSTEM

[75] Inventor: Shingo Nomura, Nabari, Japan

[73] Assignee: Sharp Kabushiki Kaisha, Osaka-fu, Japan

[21] Appl. No.: 397,720

[22] Filed: Mar. 2, 1995

Related U.S. Application Data

[63] Continuation of Ser. No. 157,326, Nov. 26, 1993, abandoned.

[30] Foreign Application Priority Data

Nov. 26, 1992 [JP] Japan ..................................... 4-316918

[51] Int. Cl.$^6$ .............................. G06F 7/04; G06F 13/00
[52] U.S. Cl. .............. 395/375; 364/232.22; 364/931.11; 364/942.79; 364/DIG. 1
[58] Field of Search ........................ 395/375; 364/232.22, 364/931.11, 942.79

[56] References Cited

U.S. PATENT DOCUMENTS

| | | | |
|---|---|---|---|
| 4,577,292 | 3/1986 | Bernstein | 365/189.07 |
| 4,720,780 | 1/1988 | Dolechek | 395/800 |
| 4,809,159 | 2/1989 | Sowa | 395/800 |
| 4,833,605 | 5/1989 | Terada et al. | 395/310 |
| 4,953,083 | 8/1990 | Takata et al. | 395/250 |
| 4,965,715 | 10/1990 | Yoshida | 395/375 |
| 5,093,919 | 3/1992 | Yoshida et al. | 395/800 |
| 5,125,097 | 6/1992 | Okamoto et al. | 395/800 |
| 5,257,392 | 10/1993 | Okamoto | 395/800 |
| 5,341,507 | 8/1994 | Terada et al. | 395/800 |
| 5,349,683 | 9/1994 | Wu et al. | 395/800 |

FOREIGN PATENT DOCUMENTS

| | | |
|---|---|---|
| 6297042 | 5/1987 | Japan. |
| 3278192 | 12/1991 | Japan. |
| 5174167 | 7/1993 | Japan. |

*Primary Examiner*—Robert B. Harrell
*Assistant Examiner*—Kenneth R. Coulter

[57] ABSTRACT

A data flow processor 10 having a plurality of input ports INA and INB, and a plurality of output ports A and B, includes an input unit 12, an operation unit 14, a branching unit 16, and a branching control parameter register group 18. Input unit 12 applies a packet directed to operation unit 14 and other packets to branching unit 16. Operation unit 14 conducts a prescribed operation to the data packet, and applies a resultant packet to branching unit 16. Branching unit 16 stores a branching control parameter in a previously applied packet in a prescribed format in register group 18. Branching unit 16 compares a prescribed parameter included in the input packet and the branching control parameter stored in branching control parameter register group 18, and outputs the packet to one of ports A and B based on the result of comparison. A plurality of such data flow processors 10 are prepared, their input ports and output ports are connected with each other, and then data packets for setting the branching control parameters for the processors are sequentially applied and thus logical connection between the data flow processors is determined.

13 Claims, 6 Drawing Sheets

DATA FLOW PROCESSOR WITH VARIABLE LOGIC CONNECTION BETWEEN PROCESSORS IN A SYSTEM

This application is a continuation, of application Ser. No. 08/157,326 filed on Nov. 26, 1993, now abandoned.

BACKGROUND OF THE INVENTION

1. Field of the Invention

The present invention relates generally to data flow processors for processing a data packet including a set of a processing instructions and data to be processed. More specifically, it relates a data flow processor capable of readily establishing and changing connection with another processor.

DESCRIPTION OF THE RELATED ART

A data flow processor is an example of a parallel processing computer. The data flow processor is one kind of a von-Neumann type processor and typically processes a data packet structured in the format of "processing instruction+ data to be processed". When two pieces of data to be processed are necessary for one processing instruction, the data flow processor matches data packets to be paired, and executes the instruction the moment all the data to be processed arrive. Therefore, the data flow processor is capable of parallel processing along the flow of data, unlike a von-Neumann type computer in which the order of executing instructions depends on a program counter.

A conventional data flow processor is disclosed in Japanese Patent Laying-Open No. 62-97042 (Patent Application No. 60-236735). The processor includes a memory called a token memory and a plurality of functional units. The output of the token memory is connected to the input of each functional unit, and the output of each functional unit is connected to the input of the token memory.

In the processor, a packet called a token packet, which is similar to a data packet, is used. Token packets are classified into complete token packets and result token packets. A complete token packet is produced in a token memory. The complete token packet includes all the data required for operation execution of, for example, two input instructions and includes a node name and two pieces of data. The node name indicates the destination in the token memory of the result of an operation executed based on the complete token packet, and more specifically indicates a way of processing data in the token packet. The result token packet indicates the result of an operation executed in each functional unit and includes a node name and result data.

Further in the conventional processor, each token packet includes data called "ID (IDENTIFICATION) number". Each functional unit is assigned with a unique ID number. When the token memory is to output a complete token packet, the token memory refers to the ID number included in the complete token packet, and applies the complete token packet to a functional unit having a matching ID number. Accordingly, the token memory in the conventional processor is provided with an ID number determination circuit.

According to the aforementioned prior art document, a plurality of functional units may have the same ID number. In that case, an ID number determination circuit is provided which can find a free functional unit among the plurality of functional units having the same ID number. The token memory then applies the token packet to the free functional unit.

One object of the conventional processor is to permit a plurality of different kinds of functional units to be readily incorporated in one data flow processor.

Meanwhile, there have been demands for development of systems including a plurality of separate data flow processors connected with each other and capable of executing a number of processings at a time. The above-described conventional technique cannot be directly applied for this purpose. As a solution, a system may be considered in which an ID number is previously attached to each data flow processor and a data packet to be input also includes information similar to the ID number.

In this case, however, since an ID number assigned to each data flow processor is fixed, hardware connection must be established taking into account such an ID number assigned to each data flow processor. Otherwise, a data flow program might be incorrectly executed due to wrong connection. Also in such a system, connection between data flow processors assigned with unique ID numbers is fixed. There has been much difficulty in producing programs, because much consideration should always be taken for the state of connection between the data flow processors. When connection between the processors is changed, actual hardware connection between the processors and setting of each processor ID number must be carefully made. Therefore, it has been very difficult to implement a wide variety of connections in one system using a number of data flow processors.

One solution to the above problem would be to separate the hardware and logical connections between data flow processors. If it becomes possible to change only logical connection between data flow processors with hardware connection remaining fixed, the above-described problem will be solved. However, there has never been such a technique.

SUMMARY OF THE INVENTION

It is therefore an object of the present invention to provide a data flow processor capable of readily setting and changing its logical connection with other such processors.

Another object of the present invention is to provide a data flow processor capable of readily setting and changing its logical connection with other such processors without changing hardware connection.

Yet another object of the present invention is to provide a data flow processor capable of readily setting and changing logical connection with other such processors in response to a specific data packet, without changing hardware connection.

An additional object of the present invention is to provide a data flow processor capable of selecting one of a plurality of outputs based on the destination information of a data packet and changing the manner of selection without changing hardware connection.

A data flow processor according to the present invention includes a plurality of input ports, a branching control information register for storing prescribed branching control information included in a specific data packet, a packet processing circuit for processing a usual data packet applied from an input port and outputting an output data packet, and a branching circuit for selecting one of the plurality of output ports based on branching condition information included in the output data packet and the branching control information stored in the branching control information register and outputting an output data packet through the selected output port.

Selection of an output port by the branching circuit is determined based on both branching control information stored in the branching control information register and branching condition information included in the usual data packet. The branching control information can be changed (prior to receiving an input data packet) so that a desired output port is selected for certain branching condition information, and therefore desired logical connection with other data processors can be established. As a result, a data flow processor capable of readily setting and changing logical connection with other processors can be provided.

The branching circuit preferably includes a first selection circuit which causes the branching control information register to store prescribed information stored in a specified data packet, compares the content of the branching control information register and branching condition information included in an applied data packet in a prescribed manner, and selects one of the plurality of output ports based on the comparison result.

A desired logical connection between data flow processors can be established without changing hardware connection by providing each data flow processor with a specific data packet which has prestored prescribed information to provide the desired logical connection.

The branching control information register more preferably includes a first register for storing information determining a position in branching condition information included in an output data packet, and a second register for storing reference information for comparison. The first selection circuit includes a second selection circuit for comparing a bit stored at the position in branching condition information included in an output data packet determined by the content of the first register and a prescribed bit in the reference information stored in the second register, and for selecting one of the plurality of output ports based on the comparison result.

A desired logical connection between data flow processors can be established without changing hardware connection by providing each data flow processor with a specific data packet which has prestored prescribed information having a prescribed bit at the prescribed position to provide the desired logical connection.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Now, a data flow processor according to one embodiment of the invention will be described in detail in conjunction with the accompanying drawings.

Figure 1:
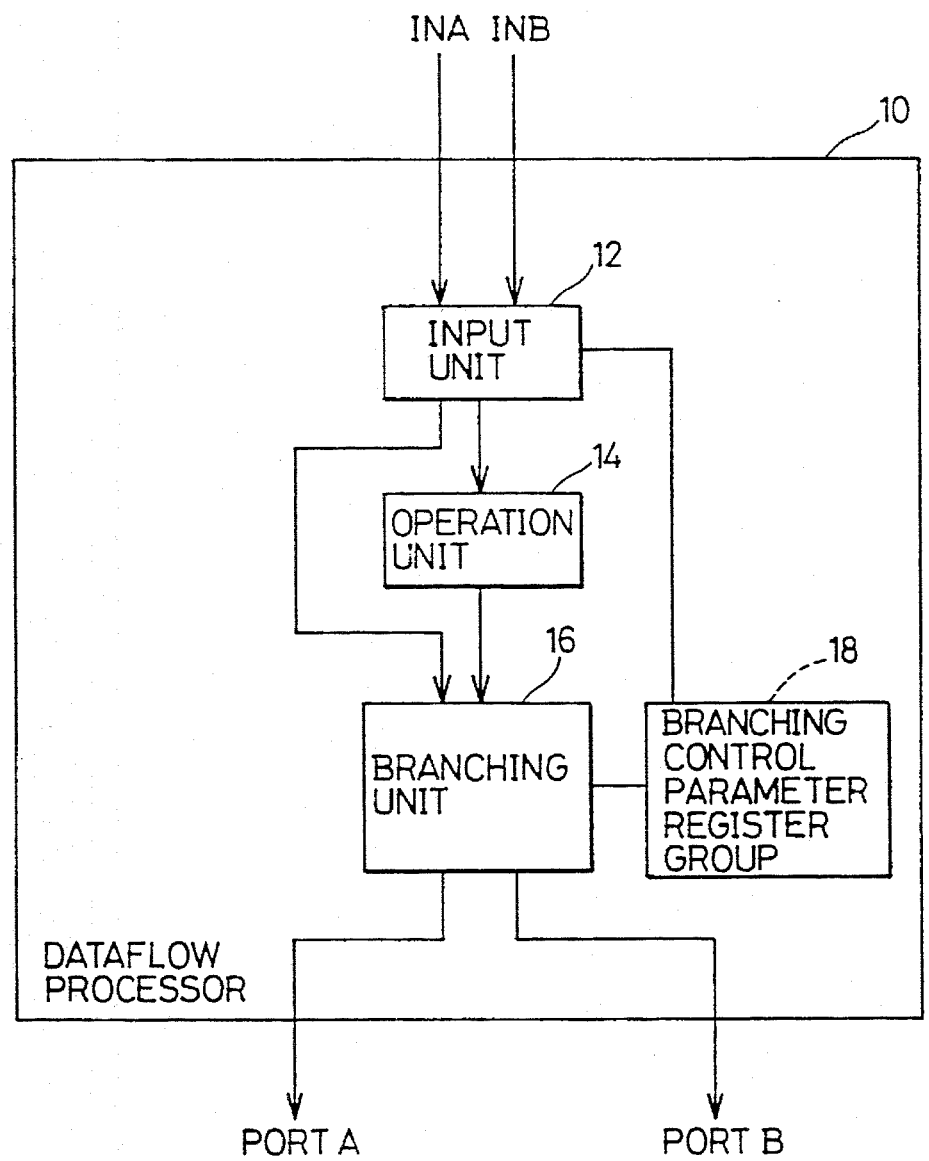
FIG. 1 is a block diagram showing a data flow processor according to one embodiment of the invention.

Referring to FIG. 1, a data flow processor 10 according to one embodiment of the invention includes an input unit 12 having two data packet input ports INA and INB for parallel-to-serial converting an input data packet. Input unit 12 has two outputs. Connected to one output is an input of an operation unit 14 for executing a prescribed operation which will be described later and producing an output packet. The output of operation unit 14 is connected to an input of a branching unit 16 having two output ports PORT A and PORT B, and outputting a data packet from one of the two ports which is selected based on a method which will be described later.

Connected to branching unit 16 is a branching control parameter register group 18 storing parameters used in determining to which port an output data packet is output.

As described above, one of the two outputs of input unit 12 is connected to operation unit 14. The other is connected to one of the inputs of branching unit 16. Input unit 12 determines whether an input data packet is directed to data flow processor 10 or to another data flow processor. Input unit 12 applies a data packet directed to data flow processor 10 to operation unit 14 and other packets to branching unit 16.

At the time of the determination, information for specifying data flow processor 10 is required in both processor 10 and the data packet. Information for specifying data flow processor 10 will be hereinafter referred to as an "ID parameter". Input unit 12 itself may store such an ID parameter. Alternatively, an ID parameter register included in branching control parameter register group 18 may store ID parameter as in this embodiment, and input unit 12 may simply refer to the ID parameter register.

Figure 2:
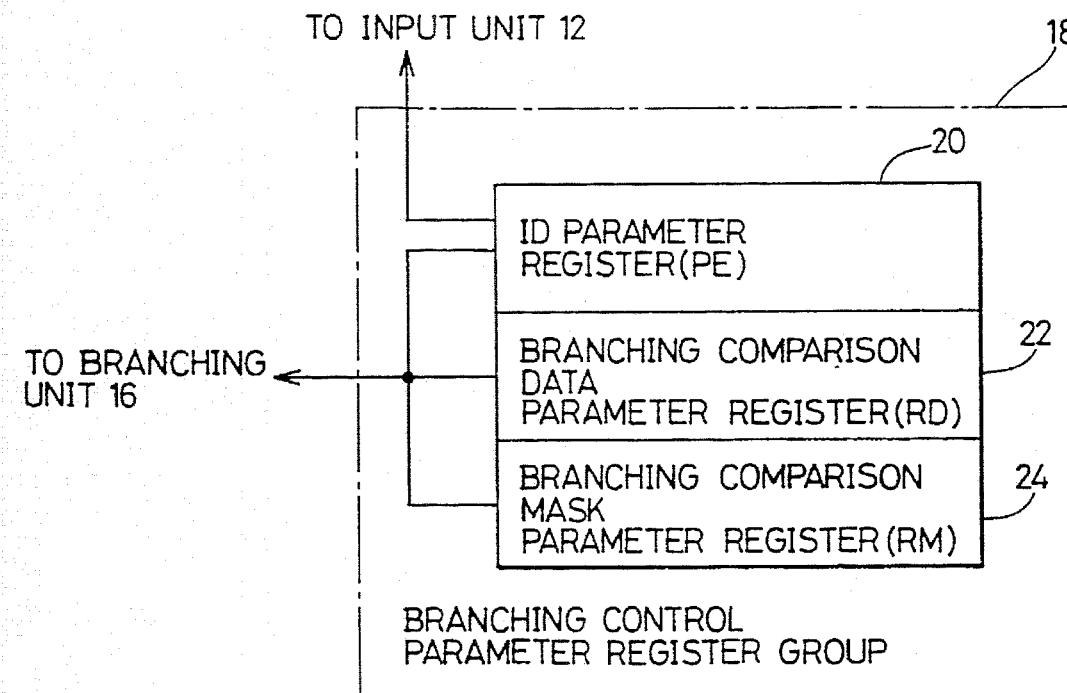
FIG. 2 schematically shows a branching control parameter register group.

Referring to FIG. 2, branching control parameter register group 18 includes an ID parameter register 20 for storing an ID parameter (PE) for specifying data flow processor 10, a branching comparison data parameter register 22 for storing a branching comparison data parameter (RD) to be compared with data in a data packet at the time of determining an output port, and a branching comparison mask parameter register 24 for storing a branching comparison mask parameter (RM) for specifying which part of data is to be used at the time of comparison. These registers 20, 22 and 24 are all connected to branching unit 16 (see FIG. 1). Parameters are read and stored in these registers 20, 22, and 24 from a specific data packet input to data flow processor 10 (such as a data packet in a prescribed format which is input immediately after a master resetting which initializes the state of each register in the processor at the time of power-up).

Figure 3:
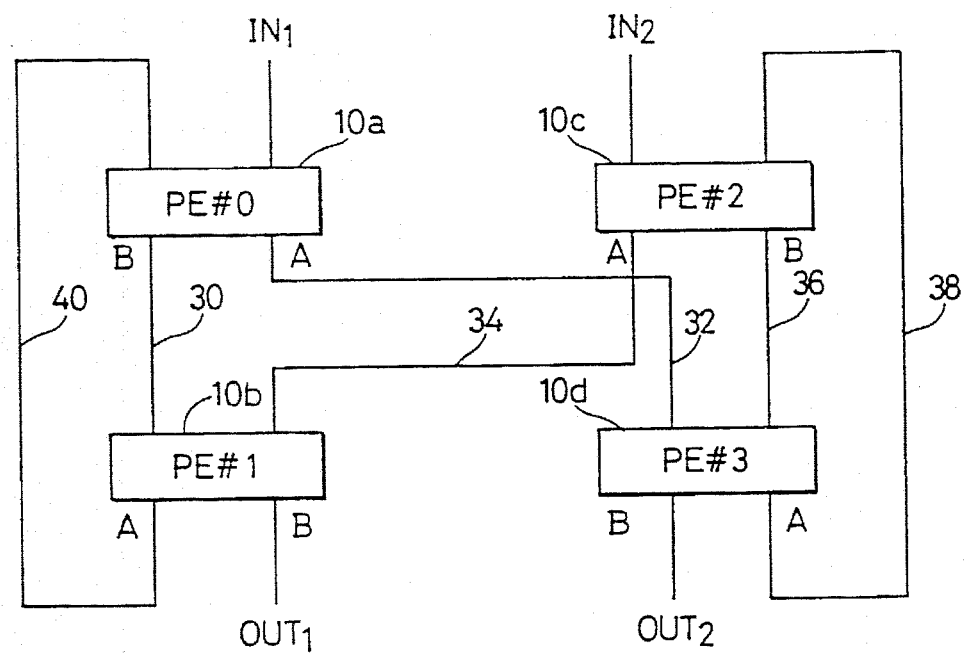
FIG. 3 is a diagram schematically showing the connection between a plurality of data flow processors according to the embodiment of the invention in a system which includes a plurality of data flow processors.

FIG. 3 shows one example of a system including four data processors 10 shown in FIG. 1. The system includes four data processors 10a–10d. These data processors will be hereinafter referred to as processors PE#0, PE#1, PE#2, and PE#3, respectively.

The output port A of processor PE#0 is connected to an input of processor PE#3 through an output signal line 32. The other output port B of processor PE#0 is connected to an input of processor PE#1 through an output signal line 30. The output port A of processor PE#1 is connected to an input of processor PE#0 through an output signal line 40. The other input of processor PE#0 is provided with an input signal (data packet) IN1 to the system.

The output A of processor PE#2 is connected to the other input of processor PE#1 through an output signal line 34. The other output port B of processor PE#2 is connected to the other input of processor PE#3 through an output signal line 36. The output port A of processor PE#3 is connected to an input of processor PE#2 through an output signal line 38. The other input of processor PE#2 is provided with an input signal (data packet) IN2 to the system. The output ports B of processors PE#1 and PE#3 output signals (data packets) OUT1 and OUT2, respectively.

The hardware connection of the system shown in FIG. 3 is as illustrated in the figure. The logical connection between processors 10a–10d in the system in practice may be established by applying data packets in a specific format as input signals IN1 and IN2 as described above at the time of power-up of the system which will be described later or arbitrarily thereafter.

FIG. 4 shows a format of a specific data packet for establishing logical connection. As illustrated in FIG. 4, the data packet includes two words each formed of 32 bits.

Figure 4A:
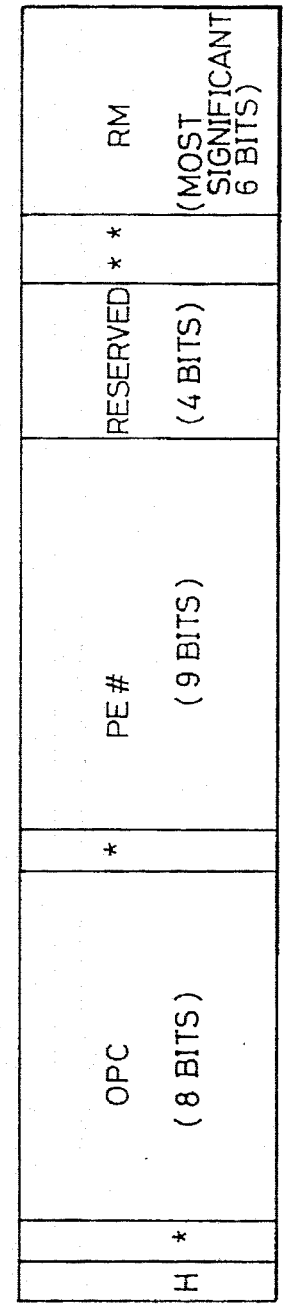
FIGS. 4(a) and (b) are schematic representations showing formats of data packets for initializing a logical connection between data flow processors according to the invention.

Referring to FIG. 4(a), the bits 29–22 of the first word is an operation code OPC. Bits 20–12 form an ID parameter PE# set in a data flow processor to which the data packet is applied. Bits 5–0 store the most significant 6 bits of a branching comparison mask parameter RM.

Figure 4B:
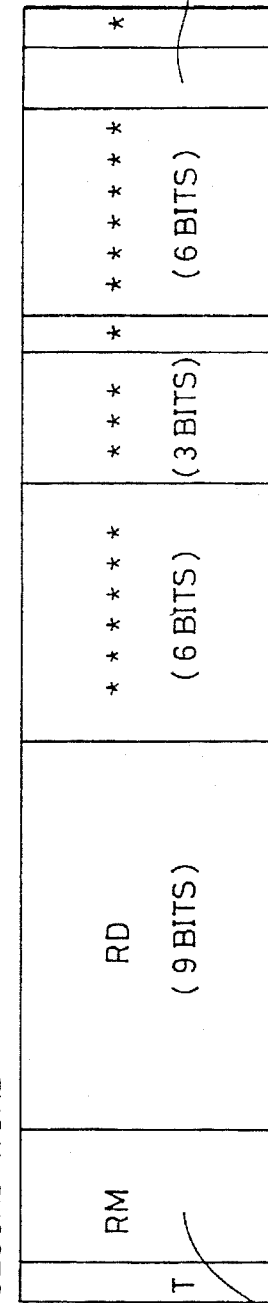

Referring to FIG. 4(b), the bits 30–28 of the second word store the least significant 3 bits of branching comparison mask parameter RM. Bits 27–19 store a branching comparison data parameter RD.

Figure 5A:
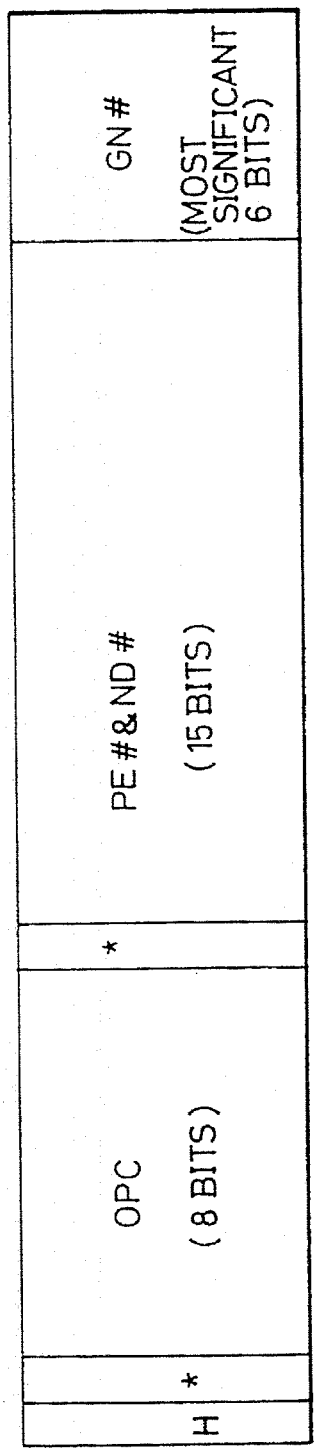
FIGS. 5(a) and (b) are schematic representations showing basic formats for data packets in a data flow processor according to the embodiment of the invention.

FIGS. 5(a) and (b) show a format of a data packet for ordinary processing input to the system as illustrated in FIG. 3. As illustrated in FIG. 5, the ordinary data packet is also formed of two words.

Referring to FIG. 5(a), the bits 29–22 of the first word store an operation code OPC. Bits 20-6 store an ID parameter PE# specifying a data flow processor to which the data packet is destined and a node number ND# of the data flow program. Bits 5-0 store the most significant 6 bits of a generation number GN#.

Figure 5B:
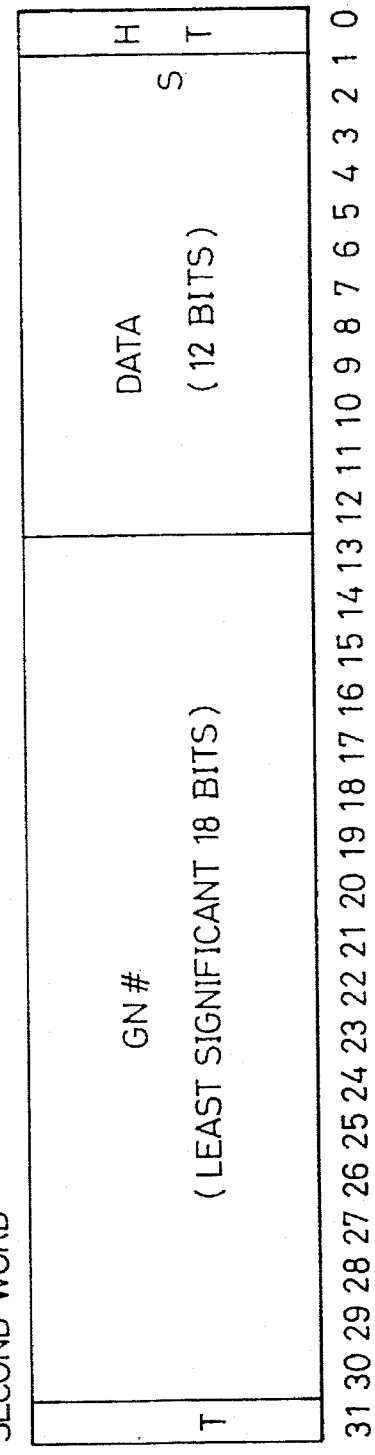

Referring to FIG. 5(b), the bits 30–13 of the second word store the least significant 18 bits of generation number GN#. Bits 12-1 store 12-bit data to be processed.

Through FIGS. 4(a)–(b) and 5(a)–(b), the bit 31 of each word is an identifier for identifying whether the word belongs to the first word or the second word.

Now, referring to FIGS. 1–4, one example of initialization for the system formed of the plurality of data flow processors shown in FIG. 3 will be described. It is assumed that prior to the initialization, registers in each data flow processor 10a–10d are all initialized with respective data. The storage contents of branching control parameter register groups 18 shown in FIG. 1 are all initialized to zeros.

The ID parameter PE#, branching comparison data parameter RD, and branching comparison mask parameter RM of the data packet input to processor PE#0 in the form of input signal IN1 are "0", "2", and "2", respectively. Processors PE#0-PE#3 each regard the first data packet input after a master resetting as a data packet directed thereto and store the values of ID parameter PE#, branching comparison data parameter RD, and branching comparison mask parameter RM included in the data packet in ID parameter register 20, branching comparison data parameter register 22, and branching comparison mask parameter register 24, respectively. Then, the data packet is discarded.

Thus, the data packet described above is applied to processor PE#0, and "0", "2" and "2" are written in the ID parameter register 20, branching comparison data parameter register 22, and branching comparison mask parameter register 24 of processor PE#0, respectively.

A data packet including "3", "4", and "0" for ID parameter PE#, branching comparison data parameter RD, and branching comparison mask parameter RM, respectively, is applied as input signal IN1 to processor PE#0. In this case, the input unit 12 of processor PE#0 (see FIG. 1) compares the content "0" of its ID parameter register 20 and the "3" of ID parameter PE# of the input data packet. Since they do not match, input unit 12 directly applies the data packet to branching unit 16. Branching unit 16 determines an output port for the data packet as follows.

Branching unit 16 in FIG. 1 determines an output port for branching the data packet based on the following expression.

$$(RM.AND. PE\#).EXOR.(RM.AND.RD) \qquad (1)$$

Note that in expression (1) the branching comparison data parameter RD and branching comparison mask parameter RM mean values stored in the branching comparison data parameter register 22 and branching comparison mask parameter register 24 of data flow processor 10, respectively, while ID parameter PE# refers to the bits 20-12 of the input data packet.

Branching unit 16 outputs data packet to port A if the value produced from expression (1) is 0 and outputs the same to port B if the value is 1.

Switching of the ports based on the above expression (1) is more specifically described by referring to Tables 1 and 2.

TABLE 1

| RM  | = 0 0 0 0 0 | 1 | 0 0 0 |         |
|-----|-------------|---|-------|---------|
| RD  | = X X X X X | 1 | X X X |         |
| PE# | = 0 0 0 0 0 | 1 | 0 1 0 | → PORT A |

TABLE 2

| RM  | = 0 0 0 0 0 | 1 | 0 0 0 |         |
|-----|-------------|---|-------|---------|
| RD  | = X X X X X | 1 | X X X |         |
| PE# | = 0 0 0 0 0 | 0 | 0 1 0 | → PORT B |

More specifically, branching comparison mask parameter RM is for determining at which bit the branching comparison data parameter RD stored in the data flow processor and the ID parameter PE# of the input data packet are compared. In the example shown in Table 1, bit 6 is determined to be an object of comparison by branching comparison mask parameter RM. In Table 1, the bits 6 of branching comparison data parameter RD and ID parameter PE# are both "1", and the value produced from expression (1) will be "0". Accordingly, the data packet is output through port A.

Meanwhile, in the case shown in Table 2, the bits 6 of branching comparison data parameter RD and ID parameter PE# are "1" and "0", respectively. Accordingly, the value produced from expression (1) is "1", and the data packet is output to port B.

Referring to the description of the initialization operation, the ID parameter PE#, branching comparison data parameter RD, and branching comparison parameter RM of the data packet input to processor PE#0 in the form of input signal IN1 are set to "3", "4", and "0", respectively. In this case, since ID parameter PE# is different from its own ID, processor PE#0 outputs the data packet to one of the two ports A and B. Based on the above expression (1), the data packet is output to port A. "3", "4", and "0" are written in the ID parameter register 20, branching data parameter register 22, and branching comparison mask parameter register 24, respectively, in processor PE#3.

Now, the ID parameter PE#, branching comparison data parameter RD, and branching comparison mask parameter RM of a data packet to be input to processor PE#2 in the form of input signal IN2 are set to "2", "2", and "0", respectively. Processor PE#2 receives a data packet for the first time after the master resetting, and therefore "2", "2" and "0" are written in the ID parameter register 20, branching comparison data parameter register 22, and branching comparison mask parameter register 24, respectively, in the processor PE#2.

The ID parameter PE#, branching comparison data parameter RD, and branching comparison mask parameter RM of the data packet input to processor PE#2 in the form of input signal IN2 are set to be "1", "4", and "0", respectively. Since the data packet has ID parameter PE# different from the ID parameter PE# of processor PE#2, processor PE#2 outputs the data packet to one of output ports A and B. In this case, based on the above expression (1), the data packet is applied to processor PE#1 through port A. The data packet is the first data packet for processor PE#1 after the master resetting. Therefore "1", "4", and "0" are written in the ID parameter 20, branching comparison data parameter register 22, and branching comparison mask parameter register 24 in processor PE#1, respectively.

In the above description, processors PE#0-PE#3 are initialized using input signal IN1 input to processor PE#0 and input signal IN2 input to processor PE#2. The processor however may be initialized by another method. For example, the data flow processors in the system are all initialized in the order of PE#0, PE#3, PE#2, and PE#1 by applying data packets as input signal IN1 while replacing the content of ID parameter PEW of the data packets in the order of PE#0, PE#3, PE#2 and PE#1. Similarly, all the data flow processors may be initialized based on processor PE#2. Alternatively, in a system according to the invention in which a plurality of data flow processors are connected, the system can be entirely initialized based on any of the data flow processors.

Once a connection is established as described above, the connection may be readily changed by once again applying a data packet in the format shown in FIG. 4.

Figure 6:
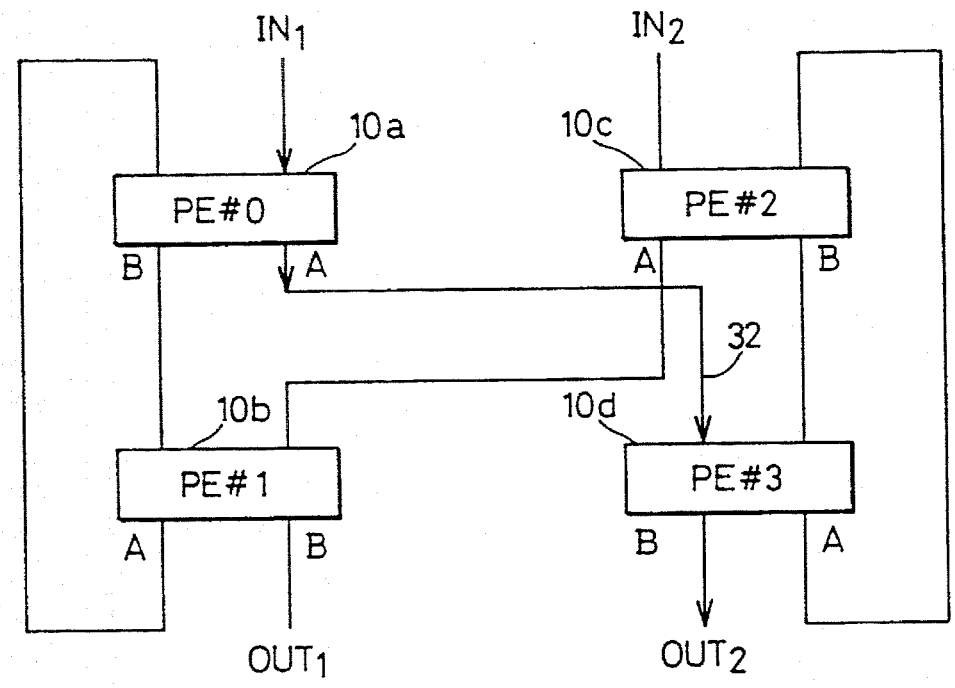
FIG. 6 is a block diagram schematically showing one example of a connection in a system including a plurality of data flow processors according to the embodiment of the invention.

In usual time, the operation of the system is conducted as follows. Referring to FIG. 6, assume that the ID parameter PE#, branching comparison data parameter RD, and branching comparison mask parameter RM of each of processors PE#0 and PE#3 are set as in the following Table 3.

TABLE 3

| PRO-CESSOR | ID PARAMETER | BRANCHING COMPARISON DATA PARAMETER | BRANCHING COMPARISON MASK PARAMETER |
|---|---|---|---|
| PE#0 | 0 | 2 | 2 |
| PE#3 | 3 | 4 | 4 |

In a data packet input in the form of input signal IN1, the uppermost eight bits of a field indicated by "PE# & ND#" in the format shown in FIG. 5 are set to "1"'s. Then, the data packet input to processor PE#0 as input signal IN1 is applied to one input of processor PE#3 from the port A of processor PE#0 through output signal line 32 without being processed at processor PE#0.

Since the ID parameter PE# of the input data packet and the ID parameter of its own do not match, processor PE#3 outputs the data packet without processing the data packet as in the following. Based on the above expression (1), in processor PE#3, the value produced from expression (1) is "1". Accordingly, the data packet is output from the port B of processor PE#3 as output signal OUT2.

Similarly, if the value of the ID parameter PE# of the data packet is made equal to the content of ID parameter register of an object data flow processor which is intended to perform a processing to the data packet, the data packet can be transferred to the object data flow processor. Values of the ID parameter register, branching comparison data parameter register, and branching comparison mask parameter register can be set for a data flow processor using respective data packets; therefore, when a number of data flow processors are connected with each other, logical connection between these data flow processors can readily be set and/or changed.

As in the foregoing, in the data flow processor according to the embodiment, a port through which a data packet is output is selected based on branching condition information included in the output data packet, and branching control information stored in the branching control information storage device. The branching control information of each data flow processor can be initialized by previously providing a data flow processor with a specific data packet including branching control information specifying a desired connection between a plurality of such data flow processors. Thus, a port through which a data packet is output can be set separately and independently for each data flow processor. Accordingly, logical connection between the plurality of data flow processors can readily be set and/or changed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data flow processor, comprising:

a plurality of input ports for receiving a data packet including branching condition data;

a plurality of output ports for outputting a data packet;

branching control information storage means for storing branching control information designating a comparison position, the comparison position designating a relative positional location for selection of a portion of stored data for subsequent comparison and for storing reference data, including branching condition data, for subsequent comparison to data in a data packet input through one of said plurality of input ports; and branching means for comparing a portion of the branching condition data of the reference data and a portion of the branching condition data of the input data packet, each portion corresponding to data located at the comparison position designated by the stored branching control information, and for selecting one of said plurality of output ports, based on the comparison, through which the input data packet is to be output, said branching means including, selection means for storing branching control information including comparison designation data (RM) and reference data (RD) in a specific data packet in said branching control information storage means, for conducting a predetermined logic operation utilizing (RM) and (RD) of said branching control information storage means and said branching condition data (PE) of the input data packet, and for selecting one of said plurality of output ports based on a result of the conducted logic operation, wherein the stored branching control information and stored reference data are variable.

2. A data flow processor as recited in claim 1, further comprising;
   determination means having an input connected to said plurality of input ports and an output connected to a packet processing means, for processing an input data packet, and said branching means, for determining whether or not an incoming data packet is directed for processing in the data flow processor and for selectively routing said input data packet to one of said packet processing means and said branching means based on a result of the determination.

3. A data flow processor as recited in claim 2, wherein said determination means for selectively routing said incoming data packet includes,
   identification information storage means for storing information for identifying the data flow processor; and
   comparison means for comparing destination information of an input data packet and contents of said identification information storage means, and for selectively applying said input data packet to one of said packet processing means and said branching means based on a result of the comparison.

4. A data flow processor as recited in claim 1, wherein said branching means includes,
   first selection means for causing branching control information of the input data packet to be stored in said branching control information storage means as said stored branching control information, and for comparing stored branching control information and said branching condition data included in the input data packet in a prescribed manner, and for selecting one of said plurality of output ports based on a result of the comparison.

5. A data flow processor as recited in claim 4, wherein said branching control information storage means includes,
   first storage means for storing the branching control information designating a position in said branching condition data included in the input data packet, and
   second storage means for storing the reference data for comparison,
   said first selection means including second selection means for comparing a bit stored at the position designated by the branching control information of said first storage means and a corresponding bit in said reference data stored in said second storage means and for selecting one of said plurality of output ports based on a result of the comparison.

6. A data flow processor as recited in claim 5, wherein said second selection means includes,
   third selection means for comparing bits, each stored at the position designated by the branching control information of said first storage means, in said branching condition data included in the input data packet and said reference data stored in said second storage means, respectively, and for selecting one of said plurality of output ports based on a result of the comparison.

7. A data flow processor as recited in claim 6, wherein said plurality of output ports includes two output ports, and
   said third selection means includes fourth selection means for comparing one bit stored at said position designated by the branching control information of said first storage means, in said branching condition data included in the input data packet and one bit, stored at the position designated by the branching control information of said first storage means, in said reference data, and for selecting one of said two output ports based on a result of the comparison.

8. A data flow processor as recited in claim 6, wherein said branching condition information included in said input data packet includes,
   a destination field of a first bit length,
   said first storage means and said second storage means have a bit length equal to said first bit length, and
   said fourth selection means includes fifth selection means for comparing the contents of bits, each at a position corresponding to a bit having a prescribed first value in said first storage means, in the content of the destination field included in the input data packet and the content of said second storage means, and for selecting one of said plurality of output ports based on a result of the comparison.

9. A data flow processor as recited in claim 8, wherein said prescribed first value is a binary "1".

10. A data flow processor as recited in claim 1, wherein said predetermined logic operation is given by the following logical expression:
    (RM AND PE) EXOR (RM AND RD), wherein AND is a logical AND operation and EXOR is a logical exclusive OR operation.

11. A data flow processor as recited in claim 10, wherein said selection means selects a predetermined first output port among said plurality of output ports if a result produced from said logical expression is "0", and selects another one of the plurality of output ports if the result does not equal zero.

12. A data flow processor comprising:
    at least one input port;
    a plurality of output ports;
    data storage means for storing variable reference data, processor identification data and variable comparison data;
    comparison means, operatively connected to the at least one input port and the data storage means, for comparing a single bit, at a predefined bit position of a data packet input from the at least one input port, to a corresponding single bit at a corresponding predefined bit position of the stored variable reference data, the predefined bit positions being predefined by the stored variable comparison data; and
    selection means, operatively connected to the comparison means and the plurality of output ports, for selecting one of the plurality of output ports, based upon the single bit comparison, through which the input data packet is to be output, wherein the comparison means initially compares the stored processor identification data to processor identification data of the input data packet, and upon determining a processor identification data match, designates the input data packet for further processing within the data flow processor.

13. The data flow processor of claim 12, wherein the single bit comparison of the comparison means is based on a predetermined logic operation.

* * * * *